US012233291B2

(12) United States Patent
Vasudeva et al.

(10) Patent No.: US 12,233,291 B2
(45) Date of Patent: Feb. 25, 2025

(54) FACE MASK WITH SMART FEATURES AND FUNCTIONS

(71) Applicants: Kailash C. Vasudeva, Waterloo (CA); Satnam Singh, Kitchener (CA)

(72) Inventors: Kailash C. Vasudeva, Waterloo (CA); Satnam Singh, Kitchener (CA)

( * ) Notice: Subject to any disclaimer, the term of this patent is extended or adjusted under 35 U.S.C. 154(b) by 379 days.

(21) Appl. No.: 17/246,180

(22) Filed: Apr. 30, 2021

(65) Prior Publication Data

US 2021/0339062 A1 Nov. 4, 2021

Related U.S. Application Data

(60) Provisional application No. 63/119,608, filed on Nov. 30, 2020, provisional application No. 63/092,461,
(Continued)

(51) Int. Cl.
*A62B 23/02* (2006.01)
*A62B 18/00* (2006.01)
*A62B 18/08* (2006.01)

(52) U.S. Cl.
CPC ............ *A62B 23/02* (2013.01); *A62B 18/006* (2013.01); *A62B 18/084* (2013.01)

(58) Field of Classification Search
CPC ..... A62B 23/02; A62B 18/006; A62B 18/084; A62B 18/025; A62B 18/045;
(Continued)

(56) References Cited

U.S. PATENT DOCUMENTS 5,303,423 A * 4/1994 Gazzara .................... A61F 9/02 128/857
2009/0250060 A1* 10/2009 Hacke .................... A61M 16/06 128/205.12
(Continued)

FOREIGN PATENT DOCUMENTS

CN 108066912 A * 10/2009 ........... A62B 18/006
DE 102016013718 A1 * 5/2018 ........... A62B 18/006
(Continued)

OTHER PUBLICATIONS

Gutierrez, "ES2778000A1 Reusable Antimicrobial Mask With Facial Protection Systems and Self-Disinfection, Circulation and Air Purification Systems, Which Allows Ingesting Liquids." (Year: 2020).*
(Continued)

*Primary Examiner* — Michael R Reid
*Assistant Examiner* — Tina Zhang

(57) ABSTRACT

Masks for being worn by a person are described herein. The masks include a shell configured to cover a nose and a mouth of the person, at least a portion of the shell having sufficient transparency to provide for visual observation of the mouth of the person when the person is wearing the mask. The shell includes an inhale port configured to provide for air to pass from an environment into a cavity defined by the shell when the person wearing the mask inhales and an exhale port configured to provide for air to pass from the cavity to the environment when the person wearing the mask exhales. The masks also include a retaining element coupled to the shell for retaining the mask on the person.

15 Claims, 15 Drawing Sheets

Related U.S. Application Data filed on Oct. 15, 2020, provisional application No. 63/018,509, filed on Apr. 30, 2020.

(58) Field of Classification Search
CPC ... A62B 23/025; A62B 18/00; A41D 13/1192; A41D 13/1281; A41D 13/1138; A41D 13/1161; A41D 13/1184
See application file for complete search history.

(56) References Cited

U.S. PATENT DOCUMENTS

| | | | | |
|---|---|---|---|---|
| 2016/0243383 | A1* | 8/2016 | Yazdi | A62B 18/025 |
| 2017/0007861 | A1* | 1/2017 | Parham | A62B 18/025 |
| 2017/0080262 | A1* | 3/2017 | Freres | H04R 1/028 |
| 2017/0157435 | A1* | 6/2017 | Choi | A41D 1/005 |
| 2019/0235625 | A1 | 8/2019 | Jeong | |
| 2021/0330831 | A1* | 10/2021 | Laty | A62B 9/006 |

FOREIGN PATENT DOCUMENTS

| | | | | |
|---|---|---|---|---|
| DE | 102016013718 | A2 | 5/2018 | |
| EP | 3485944 | A1 * | 4/1994 | A62B 18/006 |
| ES | 2778000 | A1 * | 8/2020 | A41D 13/1161 |
| KR | 100874874 | B1 | 12/2008 | |

OTHER PUBLICATIONS

International Search Report and Written Opinion mailed in related international application No. PCT/CA2021/051708, mailed Feb. 28, 2022 (15 pages).

* cited by examiner

FACE MASK WITH SMART FEATURES AND FUNCTIONS

CROSS-REFERENCE

The present application claims the benefit of U.S. Provisional Patent Application No. 63/018,509 entitled Face Mask with Smart Features and Functions filed on Apr. 30, 2020, U.S. Provisional Patent Application No. 63/092,461, entitled Face Mask with Smart Features and Functions filed on Oct. 15, 2020, and U.S. Provisional Patent Application No. 63/119,608 entitled Face Masks and Process of Coating Masks filed on Nov. 30, 2020, the contents of each of which are incorporated herein by reference.

TECHNICAL FIELD

This disclosure relates generally to face masks and/or face respirators, and more specifically, to face masks and/or face respirators with smart features or functions.

BACKGROUND

As a result of the COVID-19 pandemic, and in view of anticipated future health protocols and hesitancies, face masks are expected to increasingly become a part of daily life.

Typical face masks provide a physical barrier for a wearer but hide one's characteristic features When a wearer's mouth and nose are hidden behind the mask, verbal and non-verbal communication is impaired, leading to communication difficulties.

Typical face masks can also be irritating and painful if they do not fit properly. Most face masks have a generic shape and may not accommodate specific facial dimensions of the wearer.

Typical face masks are most often a simple piece of fabric that provide a physical barrier and are not able to provide the wearer with certainty that harmful debris and/or pathogens are being blocked from entering the wearer's mouth and nose.

Accordingly, there is a need for improved face masks and/or face respirators with smart features or functions.

SUMMARY

In accordance with a broad aspect, a face mask for being worn by a person is described herein. The face mask includes a shell configured to cover a nose and a mouth of the person, at least a portion of the shell having sufficient transparency to provide for visual observation of the mouth of the person when the person is wearing the face mask. The shell includes an inhale port configured to provide for air to pass from an environment into a cavity defined by the shell when the person wearing the face mask inhales and an exhale port configured to provide for air to pass from the cavity to the environment when the person wearing the face mask exhales. The face mask also includes a retaining element coupled to the shell for retaining the face mask on the person.

In at least one embodiment, the face mask includes a sealing member coupled to a perimeter of the shell, the sealing member being configured to provide for the face mask to fit snuggly against the face of the user and inhibit passage of air between the cavity and the environment.

In at least one embodiment, the face mask includes a first filter positioned in the inhale port such that air passing through the inhale port passes through the first filter, the first filter being configured to deactivate a pathogen in the air as the air passes through the first filter.

In at least one embodiment, the first filter is configured to be removable from the inhale port.

In at least one embodiment, the face mask includes a second filter positioned in the exhale port such that air passing through the exhale port passes through the second filter, the second filter being configured to deactivate a pathogen in the air as the air passes through the second filter.

In at least one embodiment, the second filter is configured to be removable from the inhale port.

In at least one embodiment, the face mask includes a first inhale port and a second inhale port, each of the inhale ports having the first filter configured to deactivate the pathogen.

In at least one embodiment, the first inhale ports are positioned on opposed sides of the portion of the shell having sufficient transparency to provide for visual observation of the mouth of the person when the person is wearing the face mask.

In at least one embodiment, the exhale port is positioned below the portion of the shell having sufficient transparency to provide for visual observation of the mouth of the person when the person is wearing the face mask.

In at least one embodiment, the pathogen is a virus.

In at least one embodiment, the inhale and exhale ports further comprise one or more ultraviolet-C light emitting diodes (UVC LEDs) to sanitize air passing therethrough.

In at least one embodiment, the UVC LEDs are powered by one or more rechargeable or single use batteries.

In at least one embodiment, the face mask includes a sensor configured to measure personal body statistics of the person.

In at least one embodiment, the personal body statistics include at least one of: heart rate, breathing rate and body temperature.

In at least one embodiment, the sensor is further configured to wireless transmit the personal body statistics to a computing device.

In at least one embodiment, the face mask includes ear plugs coupled to the shell.

In at least one embodiment, the inhale ports further comprise a fan to disperse air outwardly from within the cavity.

In at least one embodiment, the fan is powered by one or more rechargeable or single use batteries.

In at least one embodiment, the face mask includes an audio system integrated into the face mask, the audio system comprising a microphone, an amplifier to amplify a voice of the person wearing the face mask and a speaker to transmit the voice of the person wearing the face mask outwardly from the face mask.

In at least one embodiment, the face mask includes one or more proximity sensors configured to detect a presence of one or more objects within a defined area extending outwardly from the face mask by a preselected distance and extending 360 degrees around the face mask.

In at least one embodiment, the face mask is configured to be coupled to a face shield that provides full face protection against fluid splash.

In at least one embodiment, the portion of the shell having sufficient transparency to provide for visual observation of the mouth of the person when the person is wearing the face mask is configured to be removable from the shell.

In accordance with another broad aspect, a face mask to be worn by a person is described herein. The face mask is configured to cover a nose and a mouth of the person. The face mask includes a body and an insert removable from the body, the insert having sufficient transparency to provide for visual observation of the mouth of the person when the person is wearing the face mask.

In accordance with another broad aspect, a method of producing a custom-fit face mask is described herein. The method includes capturing an image of a face of a person with a camera of a computing device; measuring on the image, using a processor, physical features of the face of the person, the measurements of the physical features including a first distance between a nose of the person and a chin of the person and a second distance between a portion of a left cheek of the person to a right cheek of the person; comparing, by the processor, the measurements to stored measurements of other people having known mask dimensions, the stored measurements being stored on a database; selecting the known mask dimensions based on the comparison of the measurements to the stored measurements; and producing the custom-fit mask having the known mask dimensions.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
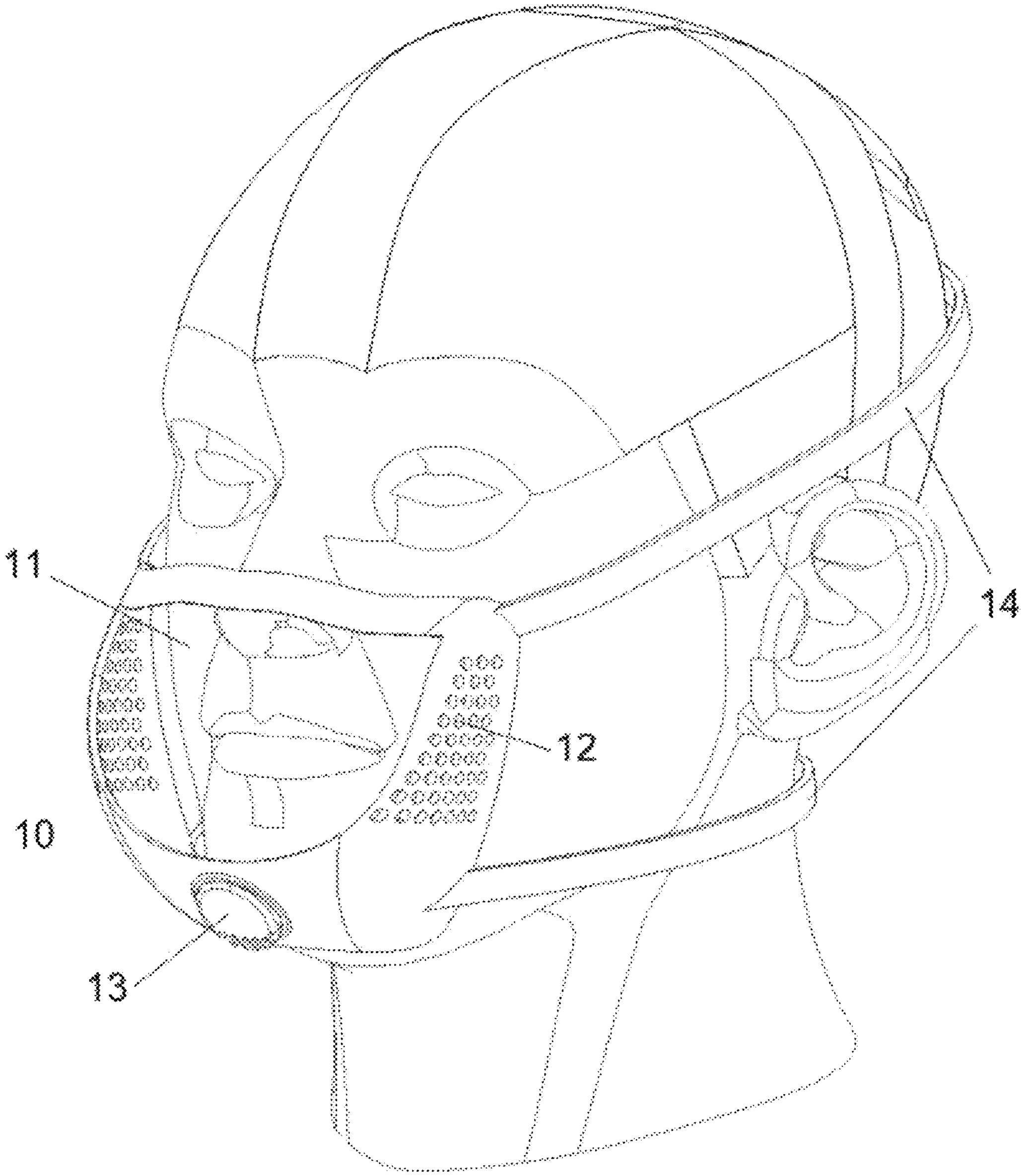
FIG. 1 is a front perspective view of a person wearing a mask according to at least one embodiment described herein.

Further aspects and features of the example embodiments described herein will appear from the following description taken together with the accompanying drawings.

DETAILED DESCRIPTION

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as “substantially”, “about” and “approximately” as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new face masks and/or face respirators and/or helmets with smart features or functions.

Respirators and/or face masks used as personal protective equipment to protect a person wearing the mask and/or respirator from airborne particles and liquids contaminating the wearer are described herein. Herein, the term "face mask" is used to refer to a mask that provides a physical barrier and covers a wearer's mouth and nose. Face masks, as used herein, may include loose fitting masks and may also include respirators. The term "respirator" as used herein refers to a device that is designed to provide a physical barrier and cover a wearer's mouth and nose and to have a tight fit providing an air tight seal between the respirator and a user's face. The face masks and respirators described herein protect a confined area of the face mask, also referred to herein as a cavity present between the face mask and the user's face, from air present in the environment (e.g. outside of the cavity of the face mask). To create a seal, the face masks described herein must fit snuggly against the face of the person wearing the face mask (e.g. such that air can only pass between the environment and the cavity defined by the face mask through one or more ports of the face mask and not through a space between a perimeter of the face mask and the wearer's face).

In at least one embodiment, the face masks described herein may be worn for an extended period, which necessitates the face mask being comfortable to wear. Generally, face masks are manufactured in a standard size intended to be used with a wide range of facial shapes and sizes. The expanse of sizes that is required to be accommodated makes it difficult to ensure a proper and comfortable fit to everyone.

In at least one embodiment, the face masks described herein may by custom-fit face masks. For instance, in at least one embodiment, precise facial dimensions of a person intending to wear the face mask can be measured, such as but not limited to by using a photograph provided by the user following predetermined guidelines such as but not limited to distance guidelines (e.g. a predetermined distance between the person's face and the camera) view guidelines (e.g. front view, perspective view, side view, etc.), lighting guidelines and the like.

In at least one embodiment, a method of producing a custom-fit face mask is described herein. The method utilizes a user interface application integrated with a database. In at least one embodiment, a customer installs an application on a device (e.g. a regular smartphone/tablet with a working front camera) and grants the application access to use the device camera. Once the application is installed and the access has been granted, the application is ready to be used.

In at least one embodiment, the user opens the application on their device and is prompted to place the camera in front of their face in such a way that their face properly fits into a frame generated by the application and shown on a display of the device. As soon as the face fits in the frame, the user is asked to click the picture. The application, through artificial intelligence, measures a portion of the user's face (e.g. a height from a point on a person's nose to a point on the person's chin and a width from a point on the user's left cheek to a point on the user's right cheek). The application then calls out our prerecorded database. In at least one embodiment, the prerecorded database may comprise a sample of about 500 users (e.g. 250 males and 250 females) from different demographics (e.g. mainly age and ethnicity). The database includes their measured mask areas (i.e. measured area of face using dimensions from the height from a point on a person's nose to a point on the person's chin and width from a point on the left cheek to a point on the right cheek, as described above). The artificial intelligence then selects the closest dimensions to that of the user from the database and sends the selected dimensions to a manufacturing unit. The manufacturing unit then manufactures the masks as per the dimensions.

In at least one embodiment, the person intending to wear the face mask may provide a face profile such as but not limited to a three-dimensional (3D) image of their face, for instance provided by a laser probe. It should be understood that other similar methods for creating a customized fitting face mask may also be used.

Further, it should be understood that the face masks described herein could also have customized aesthetic options, such as but not limited to being offered in various colors and/or designs (e.g. shapes) which may be selected by the person intending to wear the face mask.

In at least one embodiment described herein, the face mask may include a replaceable filter cartridge providing for the face mask to be used for long periods of time.

Turning to the figures, FIG. 1 shows a face mask 10 according to at least one embodiment described herein. Face mask 10 has a shell 11. Shell 11 has at least one inhale port 12. In the embodiment shown in FIG. 1, shell 11 has two inhale ports 12. Shell 11 also has an exhale port 13.

Shell 11 is configured to cover a nose and a mouth of the person. Shell 11 includes at least a portion thereof having sufficient transparency to provide for visual observation of the mouth of the person when the person is wearing the face mask. The portion of shell 11 having sufficient transparency to provide for visual observation of the mouth of the person when the person is wearing the face mask may be made of any appropriate material for blocking passage of air between the environment and a cavity defined by the shell 11. For instance, in at least one embodiment, the portion having sufficient transparency to provide for visual observation of the mouth of the person when the person is wearing the face mask may be made of a polymer such as but not limited to polycarbonate or a polycarbonate-based polymer.

In the embodiment shown in FIG. 1, each inhale port 11 is positioned on opposed sides of the portion having sufficient transparency to provide for visual observation of the mouth of the person when the person is wearing the face mask.

In the embodiment shown in FIG. 1, exhale port 11 is positioned below the portion having sufficient transparency to provide for visual observation of the mouth of the person when the person is wearing the face mask.

Face mask 10 also includes a retaining element such as but not limited to adjustable head straps 14 as shown in FIG. 1. Head straps 14 may be used by the person wearing the face mask 10 to sed retain face mask 10 on their face (e.g. covering their nose and mouth).

Figure 2:
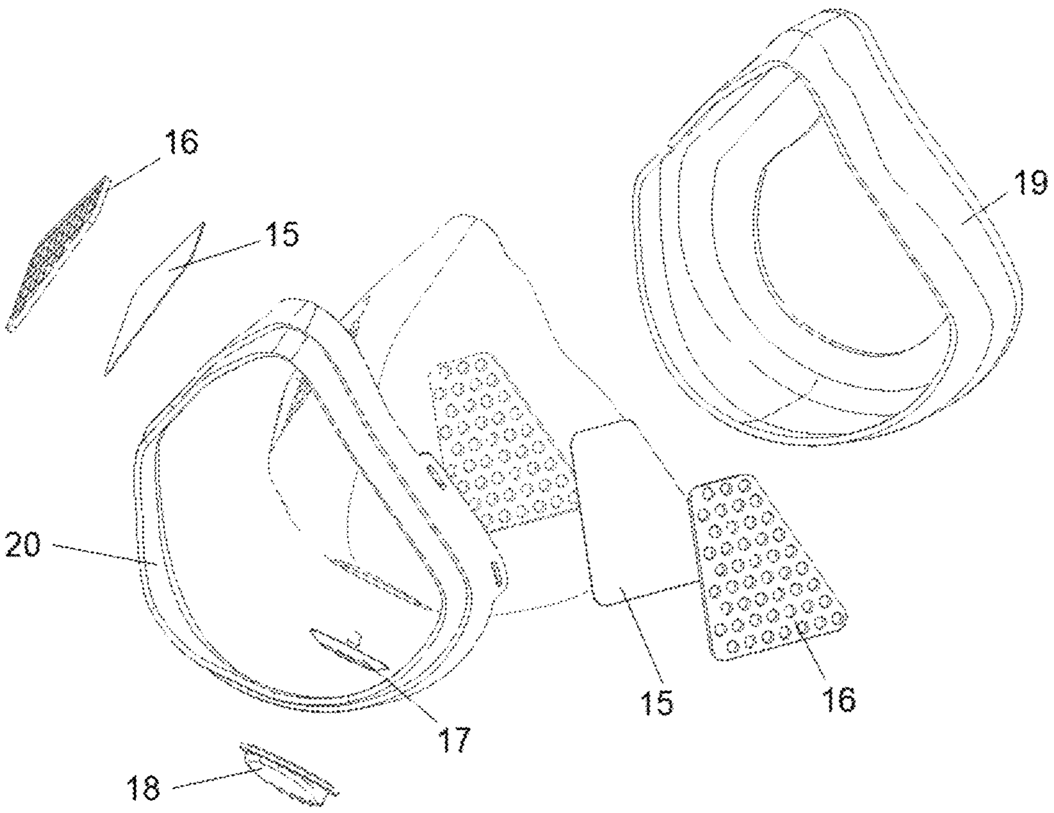
FIG. 2 is an exploded view of the components of the mask being worn by the person in FIG. 1.

FIG. 2 shows an exploded view of the components of face mask 10 of FIG. 1. In at least one embodiment, inhale port 12 has a filter 15 (e.g. a replaceable filter) and a filter retainer 16 for retaining the filter 15 in the inhale port 12.

As shown in FIG. 2, in at least one embodiment, exhale port 13 includes a valve 17. Valve 17 mane be a one-way valve, for example, and may provide for air with a cavity defined by the face mask 10 to pass outwardly from the cavity to the environment and may inhibit air from passing from the environment into the cavity defined by the face mask 10. Exhale port 13 may also include a valve cover 18.

In at least one embodiment, face mask 10 may include a sealing member 19, such as but not limited to the sealing member shown in FIG. 2. Sealing member 19 provide for sealing the face mask 10 with various face shapes and profiles. Sealing member 19 may be made of any appropriate material for inhibiting the passage of air between the cavity defined by the face mask 10 and the face of the user, such as but not limited to a polymer material including a silicone-based polymer material.

In at least one embodiment, face mask 10 may include a retainer ring 20 such as but not limited to the retainer ring 20 shown in FIG. 2. Retainer ring 20 snap fits over shell 11 and holds shell 11 and/or sealing member 19 together as one wearable unit. This final product could be an assembly of components in a variety of shapes, sizes and forms in different permutations and combinations. The assembly could also be through co-injections molding of some parts in a final mold.

In at least one embodiment, the face masks described herein may include at least one sensor to detect health information such as but not limited to heart rate, breathing rate, blood oxygen saturation, body temperature, abnormal sneezing and/or coughing by the wearer. In at least one embodiment, the sensor may be incorporated into a chip 21 of the face mask, such as but not limited to the chip 21 shown in FIG. 3. Chip 21 may include a data storage element to store data collected by the sensor. Chip 21 may also include a transmitter configured to receive the data collected by the sensor and transmit the data to a computing device, such as but not limited to a smartphone of the wearer (e.g. the smartphone having, for example, a mobile application stored thereon configured to receive the data transmitted by the chip 21). The collected data may be used for health monitoring purposes such as, for example, screening for symptoms before travel (e.g. at airports or the like).

Figure 3:
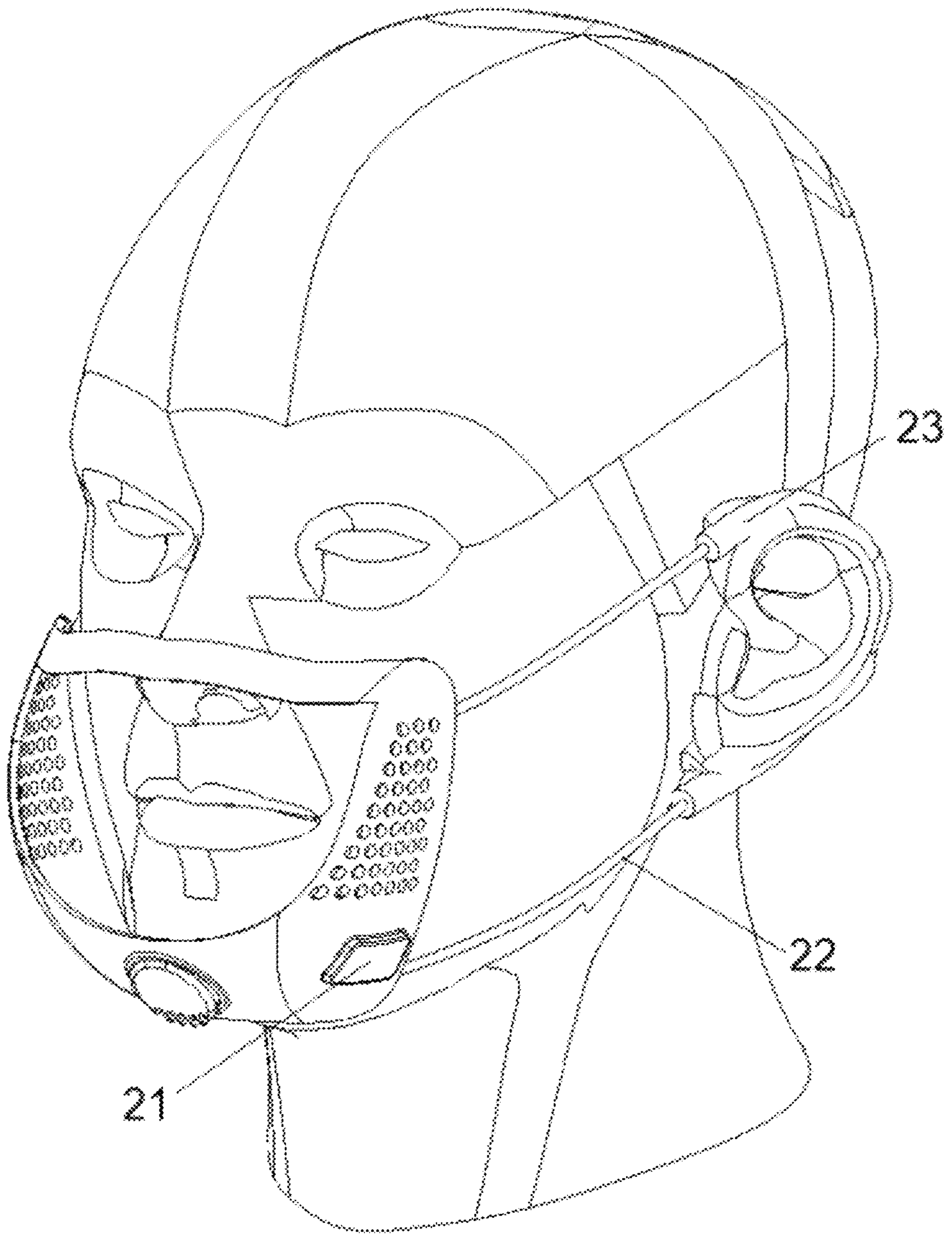
FIG. 3 is a front perspective view of a person wearing a mask according to at least one other embodiment described herein.

In at least one embodiment, retaining element 14 may include ear loops 22 with pads 23 to retain the face mask on the wearer. One example of these features is shown in FIG. 3.

Figure 4:
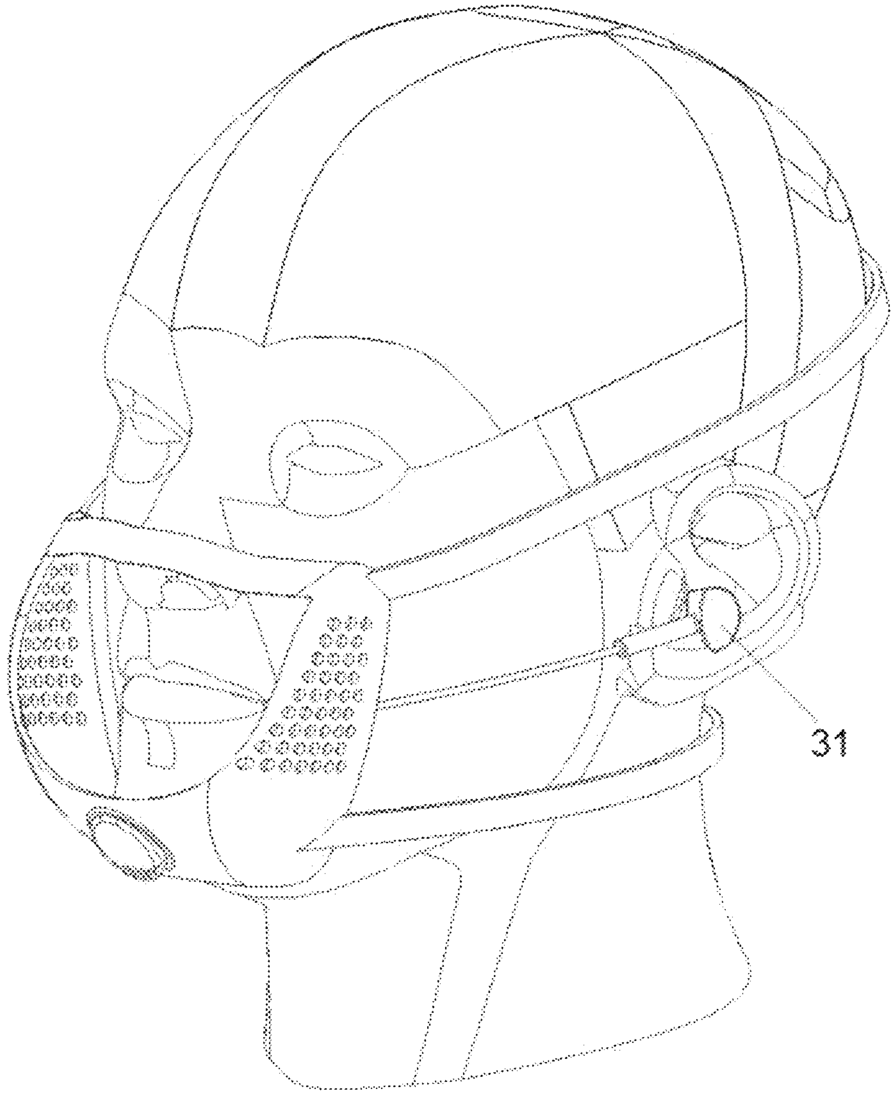
FIG. 4 is a front perspective view of a person wearing a mask according to at least one other embodiment described herein.
Figure 5:
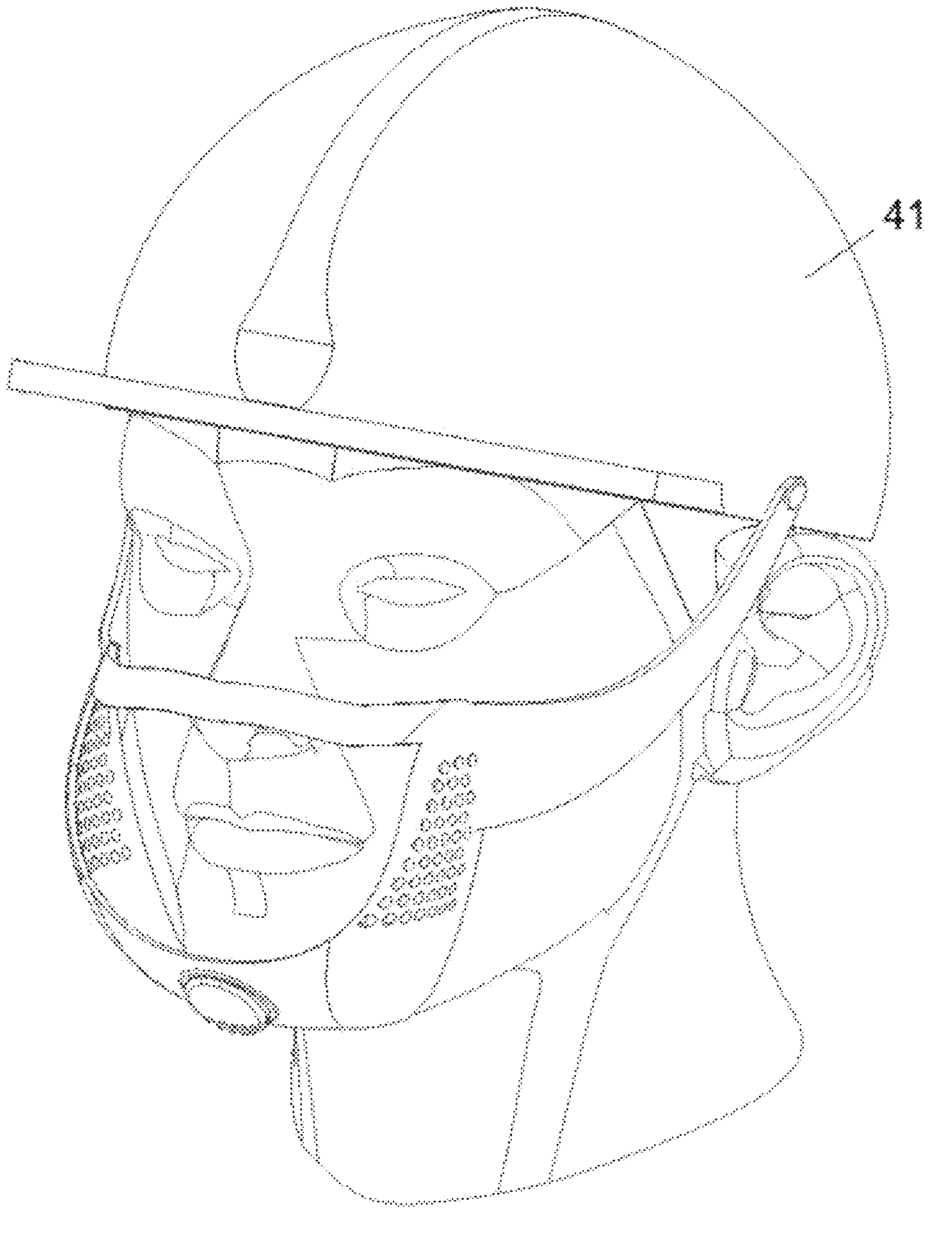
FIG. 5 is a front perspective view of a person wearing a mask according to at least one other embodiment described herein.

Turning to FIG. 4, in at least one other embodiment, the face masks described herein may include ear plugs 31. Ear plugs 31 may be coupled to shell 11 and may be integrated as part of the face mask or removably attached to the mask.

In at least one other embodiment, the face masks described herein may be removably attached to a protective head cap/face shield or be integrated as one piece with head cap/face shield, such as but not limited to protective head cap 41 of FIG. 4.

Figure 6:
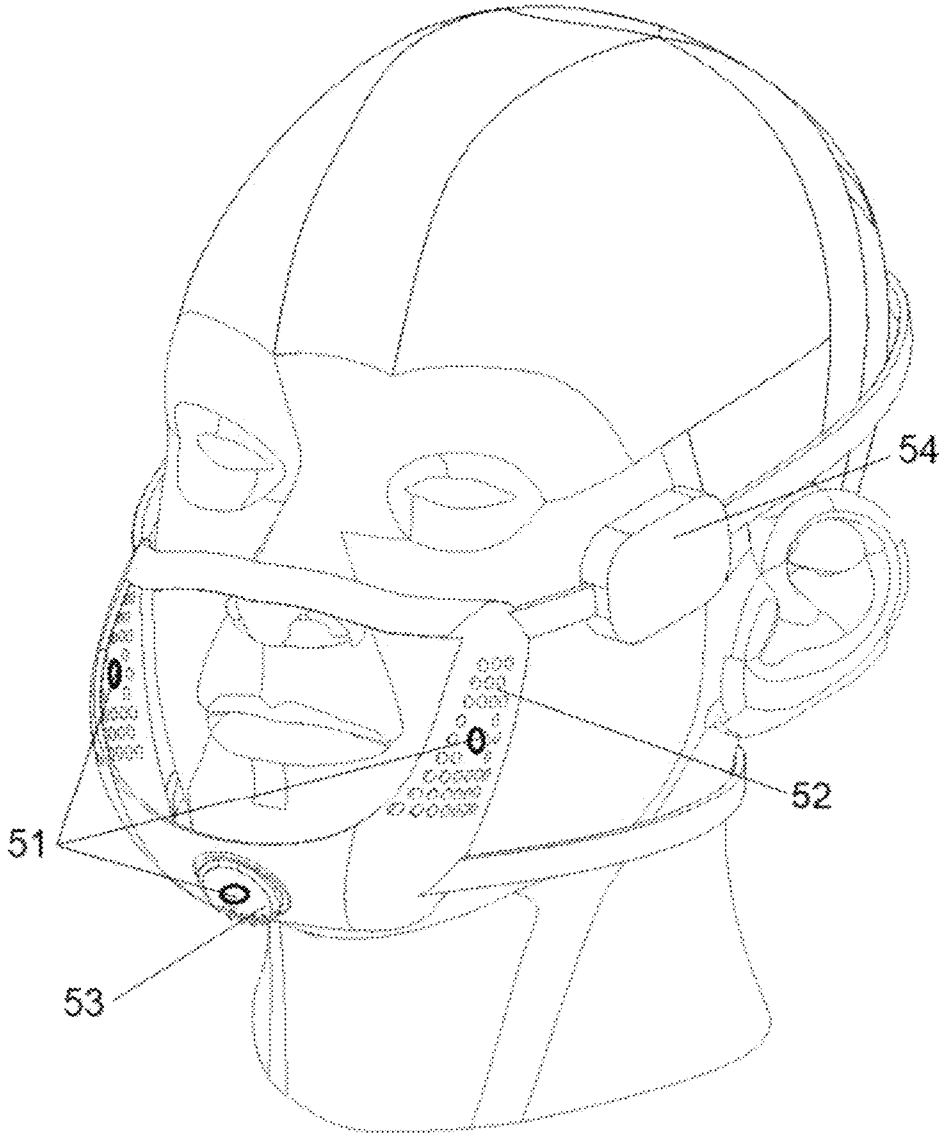
FIG. 6 is a front perspective view of a person wearing a mask, according to at least one other embodiment described herein.

In at least one other embodiment, the face masks described herein may include one or more ultraviolet (UV) lamps 51 (e.g. ultraviolet-C light emitting diodes (UVC LEDs) positioned within the inhale port(s) 12 and/or the exhale port 13, as shown in FIG. 6. In at least one embodiment, the UV lamps 51 are positioned within the inhale port(s) 12 adjacent to or in combination with inhale filters 52 and/or within the exhale port 13 adjacent to exhale valve 53. In at least one embodiment, the UV lamps 51 may receive power from a battery such as but not limited to battery 54 of FIG. 6. As shown therein, battery 54 may be placed externally on the face mask or, alternatively, may be positioned within the face mask. In at least one other embodiment, the UV lamps 51 may have an intensity that provides for killing any pathogens (e.g. viruses and/or bacteria) in the air that is inhaled through inhale ports 12 and/or exhaled through exhale ports 13. Additionally, the UVC light could be safely exposed to nose and mouth area for additional protection.

Figure 7:
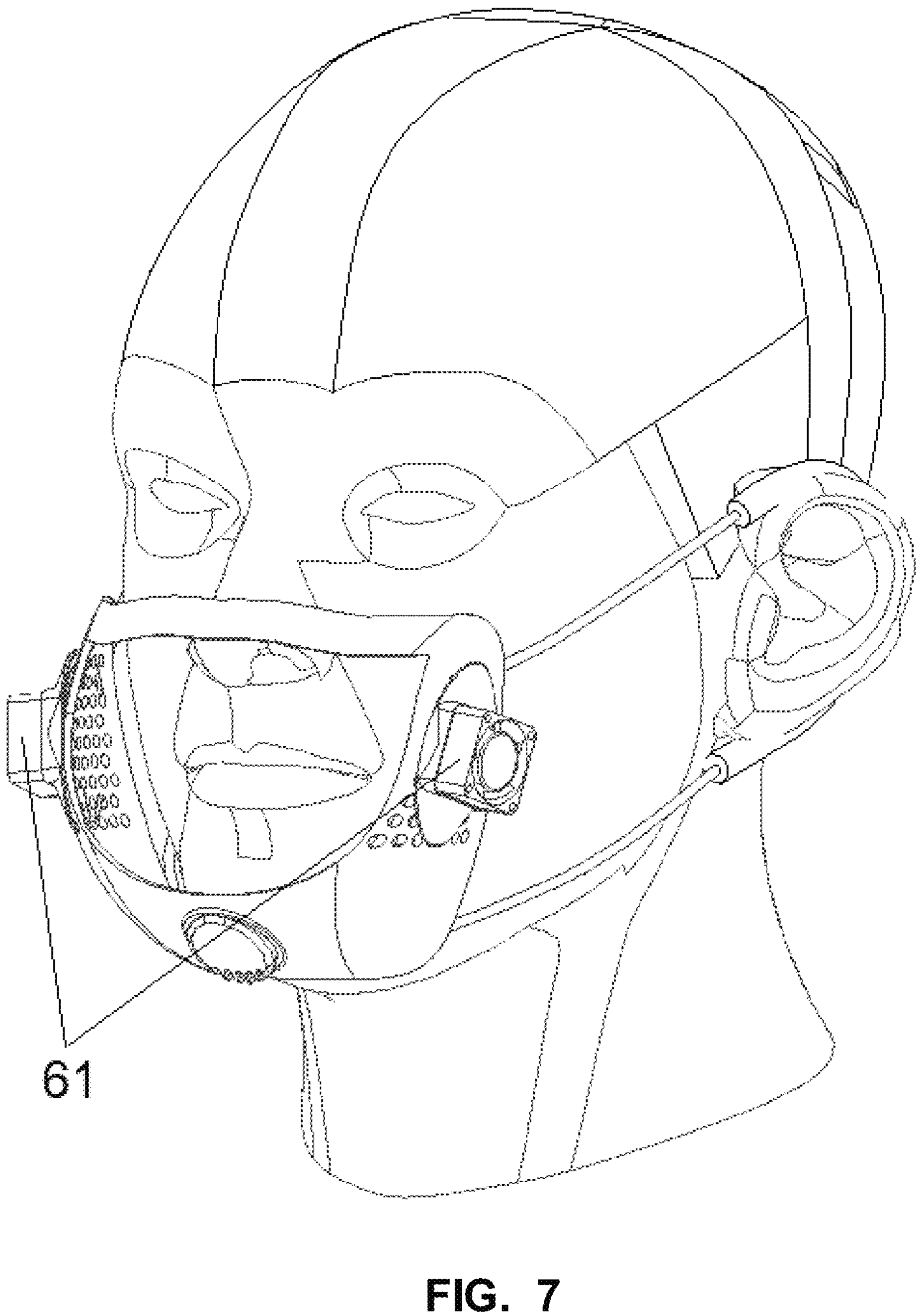
FIG. 7 is a front perspective view of a person wearing a mask, according to at least one other embodiment described herein.

In yet in another embodiment, such as but not limited to the embodiment shown in FIG. 7, the face masks described herein may include one or more exhaust fans 61. Exhaust fans 61 may be positioned on or adjacent to the inhale port(s) 12 to transfer air out of the cavity to facilitate breathing and, for example, dispel $CO_2$ from the cavity defined by the face mask.

Figure 8:
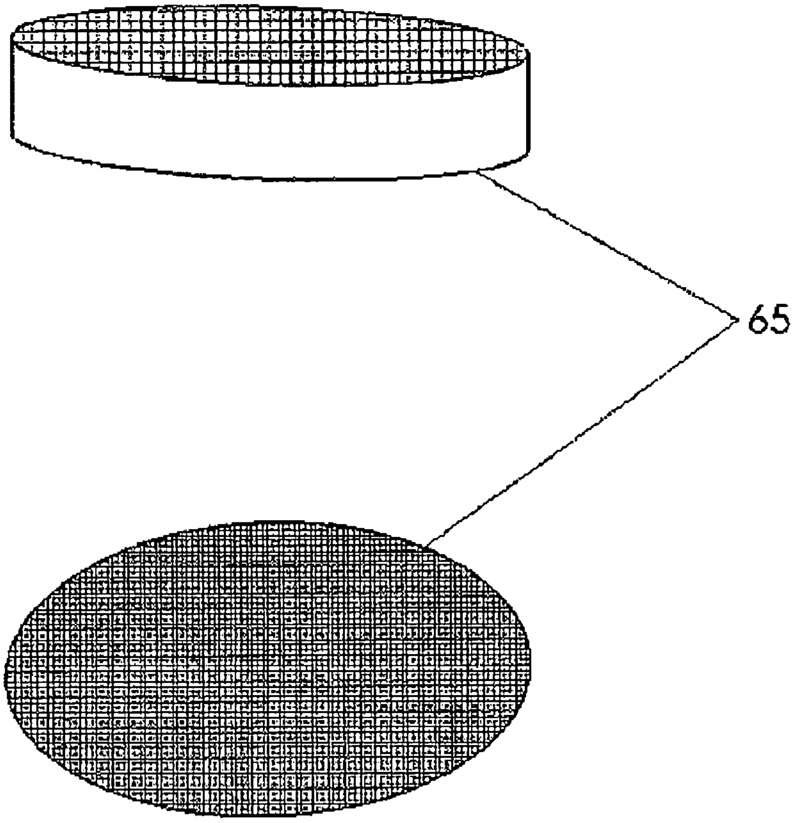
FIG. 8 shows a top perspective view and a top view of a filter of a mask according to at least one of the embodiments described herein.

As noted above, the face masks described herein may include one or more filters 15. In at least one embodiment, the filters 15 are positioned with the inhale port(s) 12 and/or the exhale port 13 such that air passing through the inhale port(s) 12 passes through the filter 15 and likewise air passing through the exhale port 13 passes through the filter 15. One embodiment of a filter 15 is shown in FIG. 8.

In at least one embodiment, the filters 15 are configured to deactivate a pathogen (e.g. virus and/or bacteria) in the air as the air passes through the filter. In at least one embodiment, the filters 15 include a non-woven polypropylene material having pores to provide for the passage of air through the filter. In at least one embodiment, the filters 15 include a non-woven polypropylene material having pores to provide for the passage of air through the filter, the non-woven polypropylene material being coated with a coating material 65 configured to deactivate a pathogen (e.g. virus and/or bacteria) in the air as the air passes through the filter 15.

In at least one embodiment, the coating material 65 comprises non-toxic ingredients such as but not limited to sodium chloride, ammonium chloride, potassium chloride, diatomaceous earth, and/or copper nanoclusters embedded in ionic liquid (IL@CuNC), and/or other similar ingredients. The ionic liquids of the IL@CuNCs may include but are not limited to cation-based ionic liquids (comprising, for example, one or more of imidazolium, pyridnium, piperidinium, pyrrolidinium, quinolinium, morpholinium, quaternary phosphonium and quaternary ammonium) and anion-based ionic liquids (comprising, for example, one or more of tetrafluoroborte, hexafluorophosphate, methylsulfate, octylsulfate, acesulfame, trifluoromethylsulfonate, halides ions, bis(trifluoromethyl)sulfonylamide, bis(trifluoromethyl) amide, and dicyanamide).

In at least one embodiment, the coating material 65 may be configured to break an outer protective layer of pathogens in the air, deactivate the pathogens and thereby make them redundant of doing any harm to human beings.

Figure 9:
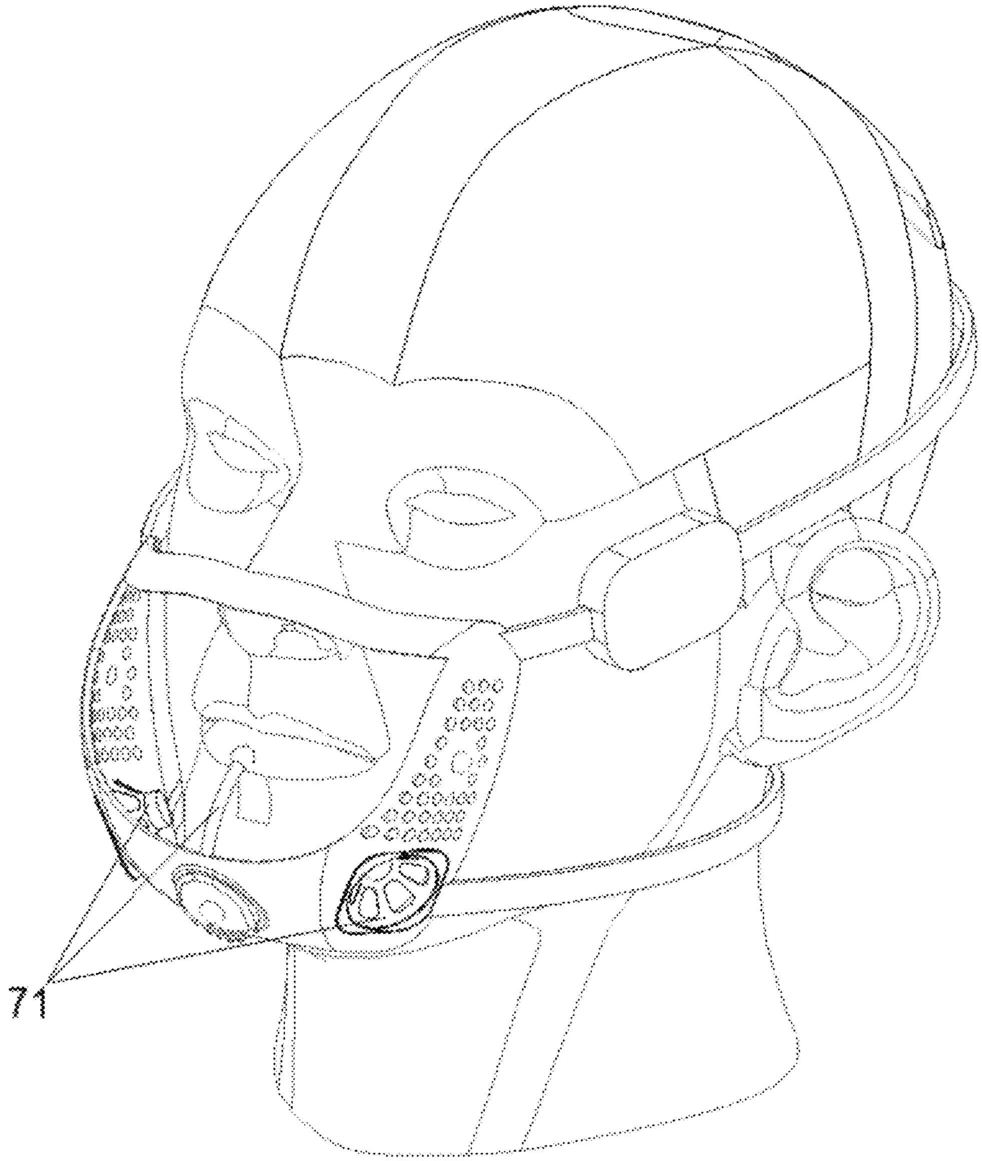
FIG. 9 is a front perspective view of a person wearing a mask according to at least one other embodiment described herein.

In at least one embodiment, such as the embodiment shown in FIG. 9, the face masks described herein may include an audio system 71. Audio system 71 may include a microphone for receiving sound such as but not limited to the voice of the person wearing the face mask, an amplifier for amplifying the received sound and a speaker for transmitted the amplified sound outwardly from the face mask.

Figure 10:
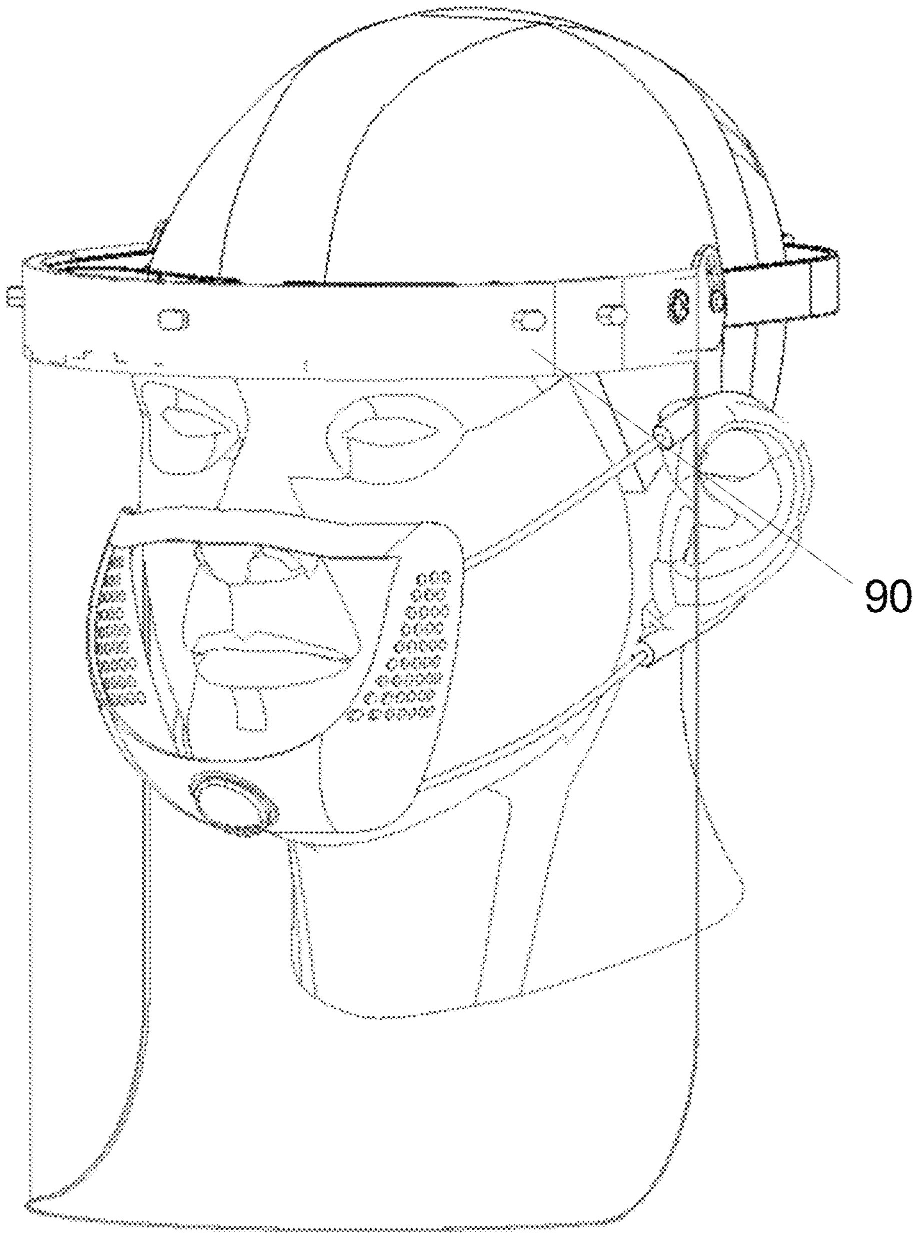
FIG. 10 is a front perspective view of a person wearing a mask having a face shield according to at least one other embodiment described herein.
Figure 11:
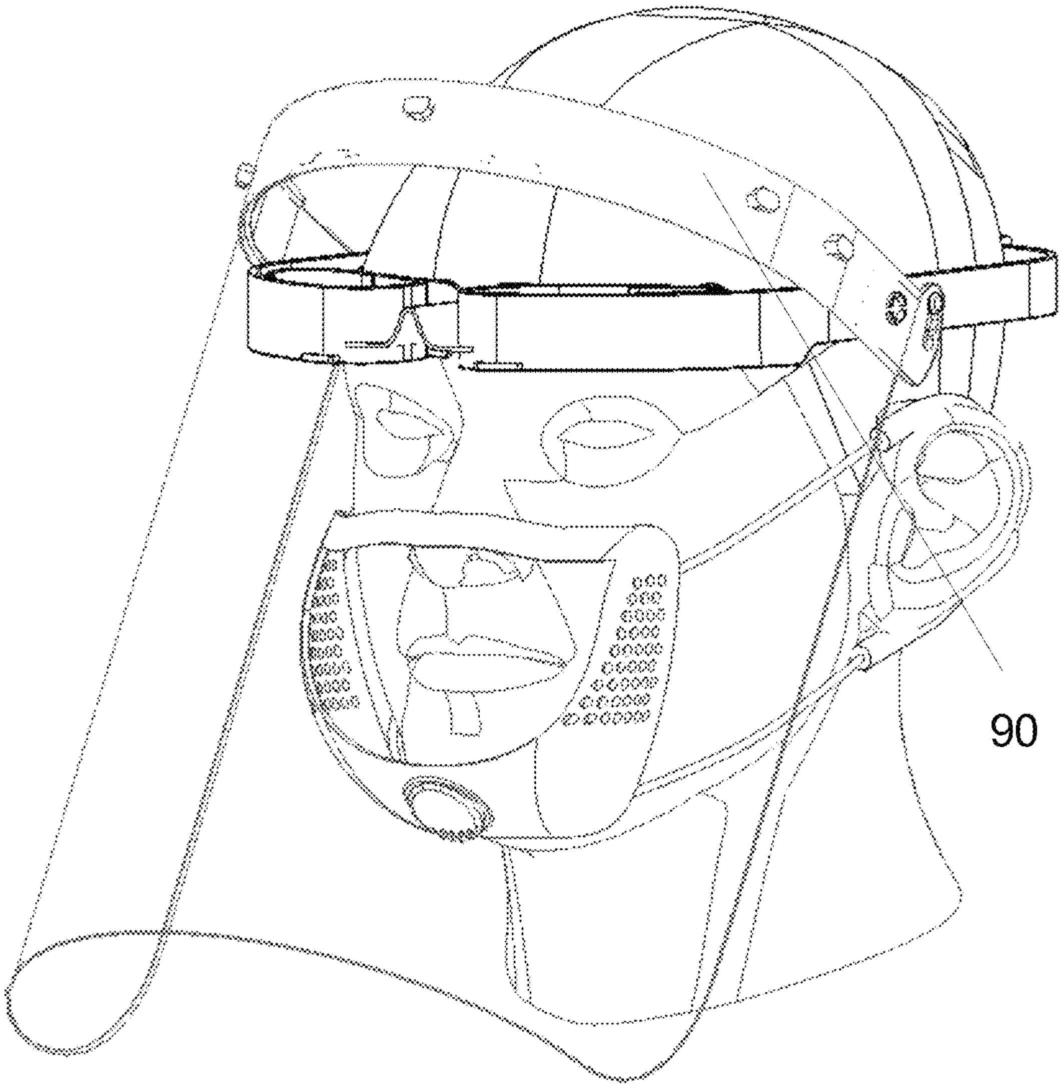
FIG. 11 is a front perspective of the person wearing the masking having a face shield of FIG. 10, the face shield being at a pivoted position.
Figure 12:
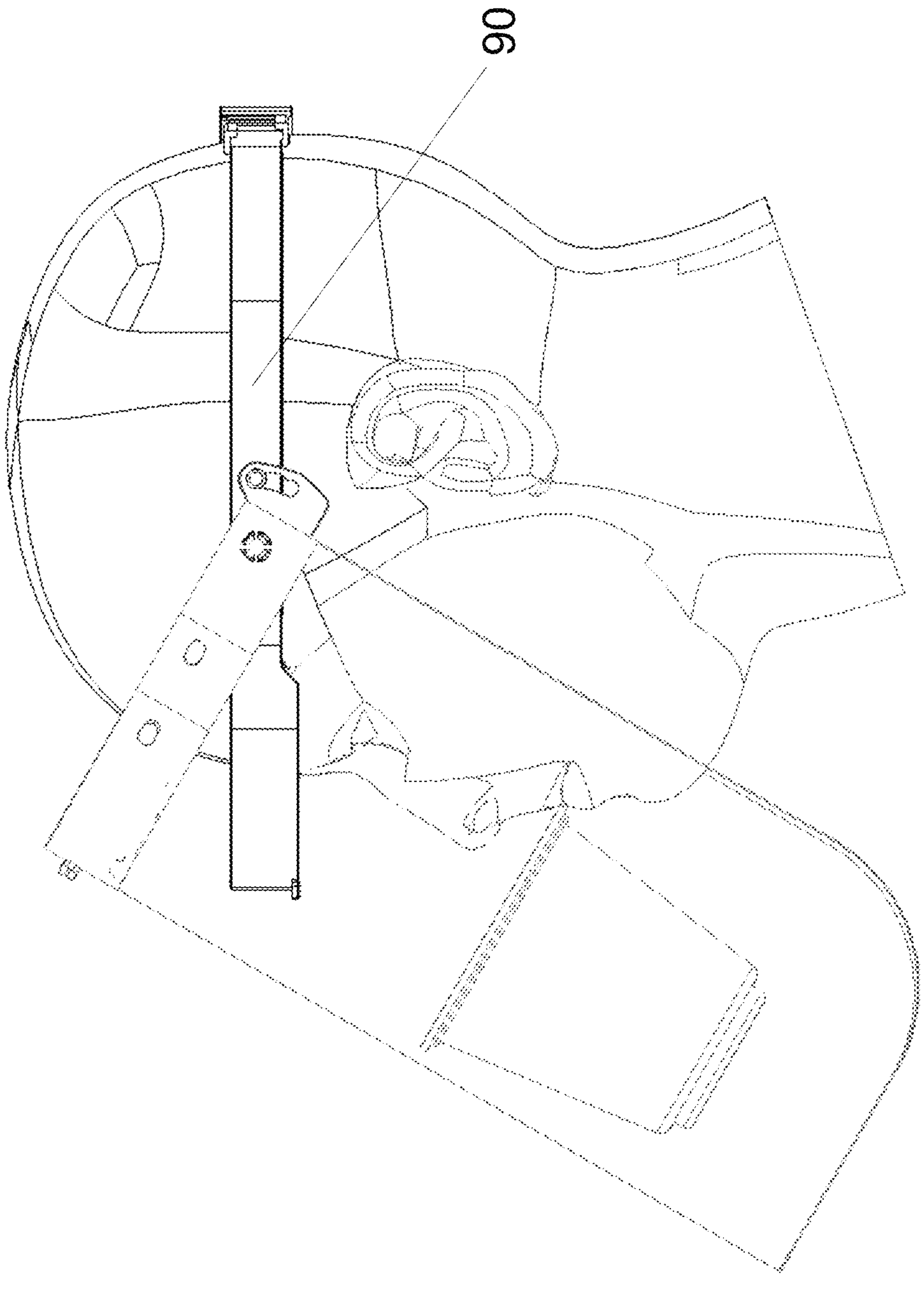
FIG. 12 is a side view of the person wearing the masking having a face shield of FIG. 10, the face shield being at a pivoted position.

In another embodiment, such as but not limited to the embodiment shown in FIGS. 10, 11 and 12, the face masks described herein may be coupled to a tiltable face shield 90. The tiltable face shield 90 may be tiltable to one or more angles (see FIGS. 11 and 12 for one exemplary angle) to provide for the wearer to eat and/or drink without fully removing the face shield. Tiltable face shield 90 may also provide full face splash protection and therefore be suitable for personnel with facial hair.

The tiltable face shield 90 may also be worn independent of face mask 10 in comparatively safer social environments.

Figure 13:
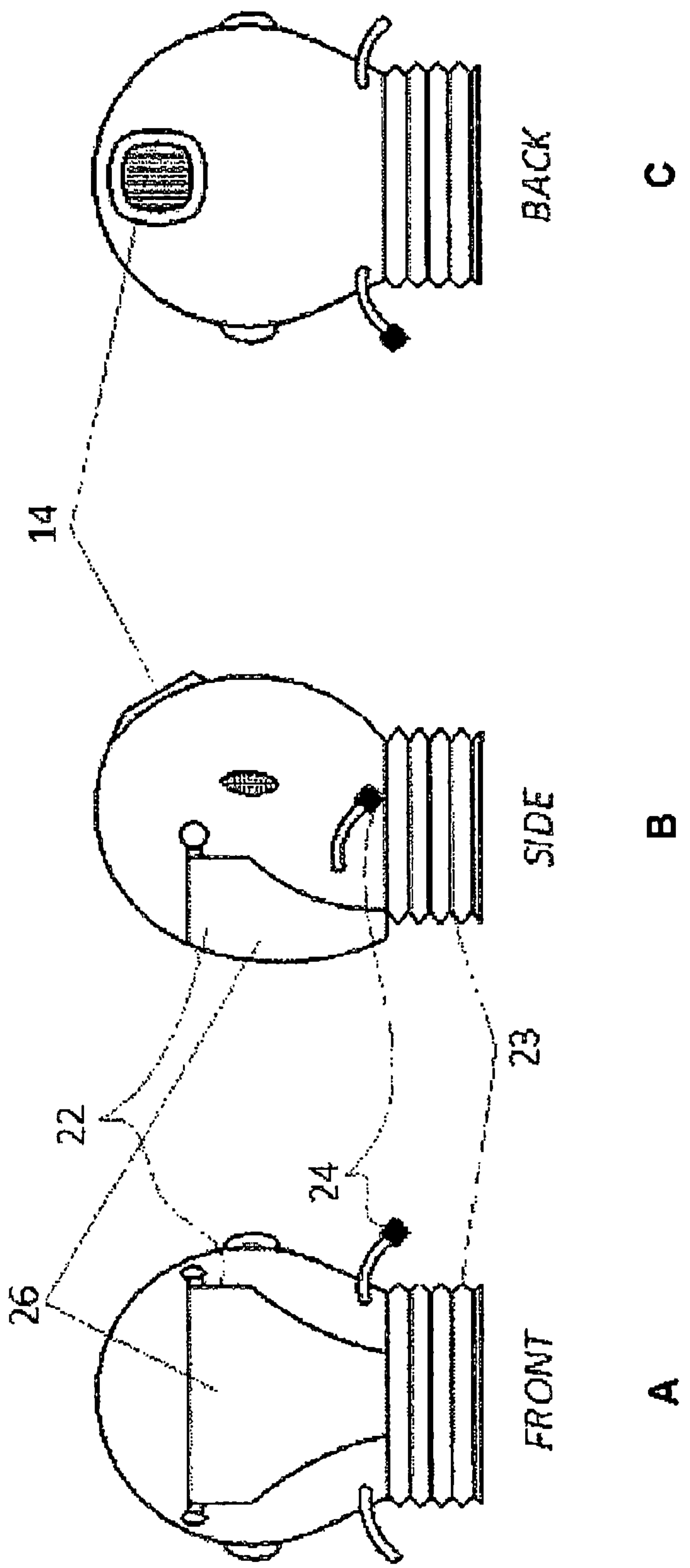
FIG. 13A is a front view of a helmet according to at least one embodiment described herein.
FIG. 13B is a side view of the helmet of FIG. 13A.
FIG. 13C is a rear view of the helmet of FIG. 13A.

In another embodiment, a face mask 20 may cover and protect a wearer's entire face, including their eyes. An example of this type of face mask 20 is shown in FIGS. 13A-13C. Face mask 20 may have a full envelop around the head of a wearer and be sealed around neck 23. This sealing makes it ideal for a person with facial hair. A tiltable sealable clear visor 26 provides for a wearer to have short breaks for a drink or snack. Replaceable inhale and exhale filter cartridges 24 are attached to the face mask 20. Also, face mask 20 may include a pressurized air curtain around the head by device 14 to ensure no contaminated air from ambient environment can enter the inner air envelop.

Figure 14:
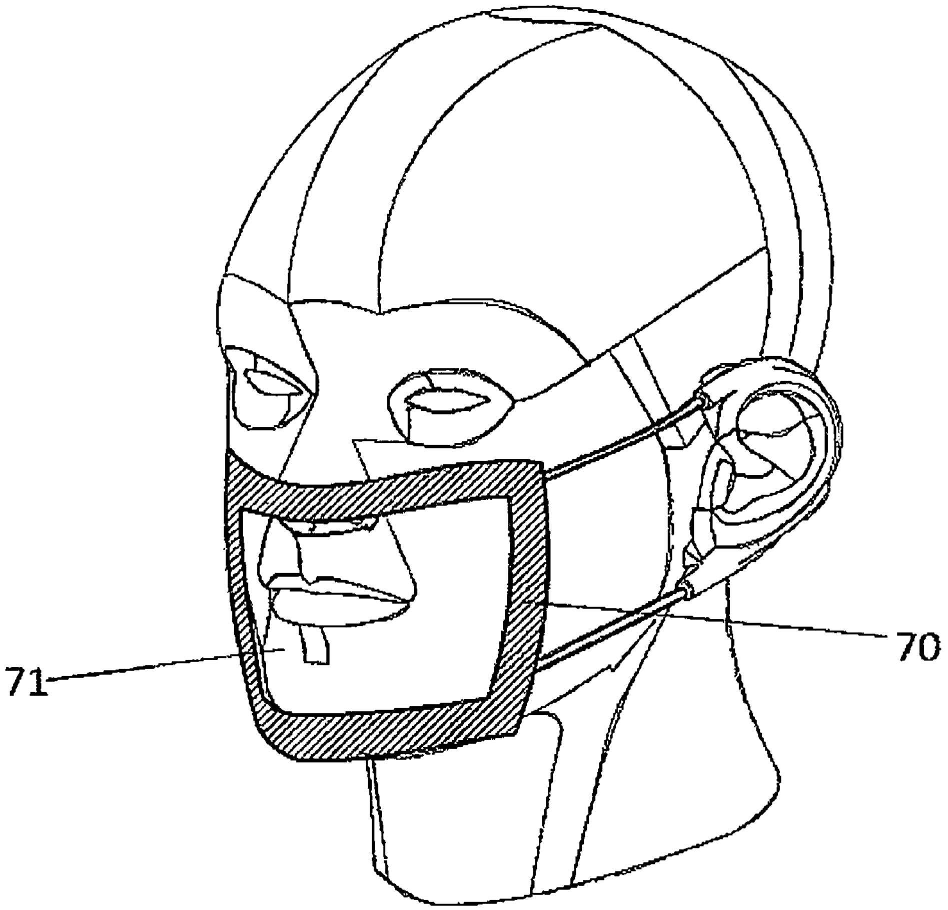
FIG. 14 is a front perspective view of a person wearing a mask, according to at least one other embodiment described herein.

FIG. 14 shows another embodiment of a face mask described herein having a body 70 and an integrated or removable insert 71. Removable insert 71 has sufficient transparency to provide for visual observation of the mouth of the person when the person is wearing the face mask. Body 70 and/or insert 71 may be coated with non-toxic ingredients such as but not limited to sodium chloride, ammonium chloride, potassium chloride, diatomaceous earth and/or IL@CuNC (as described above) or the like.

In at least one embodiment, body 70 and/or insert 71 may have one or more of the following characteristics: anti-fog, fluid resistant, latex-free, non-sterile and intended for a single-use.

In at least one embodiment, body 70 and/or insert 71 may be configured to resist penetration of fluid splatter by using the ASTM F1862 standard (splash resistance/synthetic blood resistance) (e.g. >80 mm Hg).

In at least one embodiment, body 70 and/or insert 71 may demonstrate biocompatibility. For instance, in at least one embodiment, body 70 and/or insert 71 may be non-cytotoxic (e.g. according to ISO 10993-5) and/or may be non-sensitizing and non-allergenic (e.g. according to ISO 10993-10).

Figure 15:
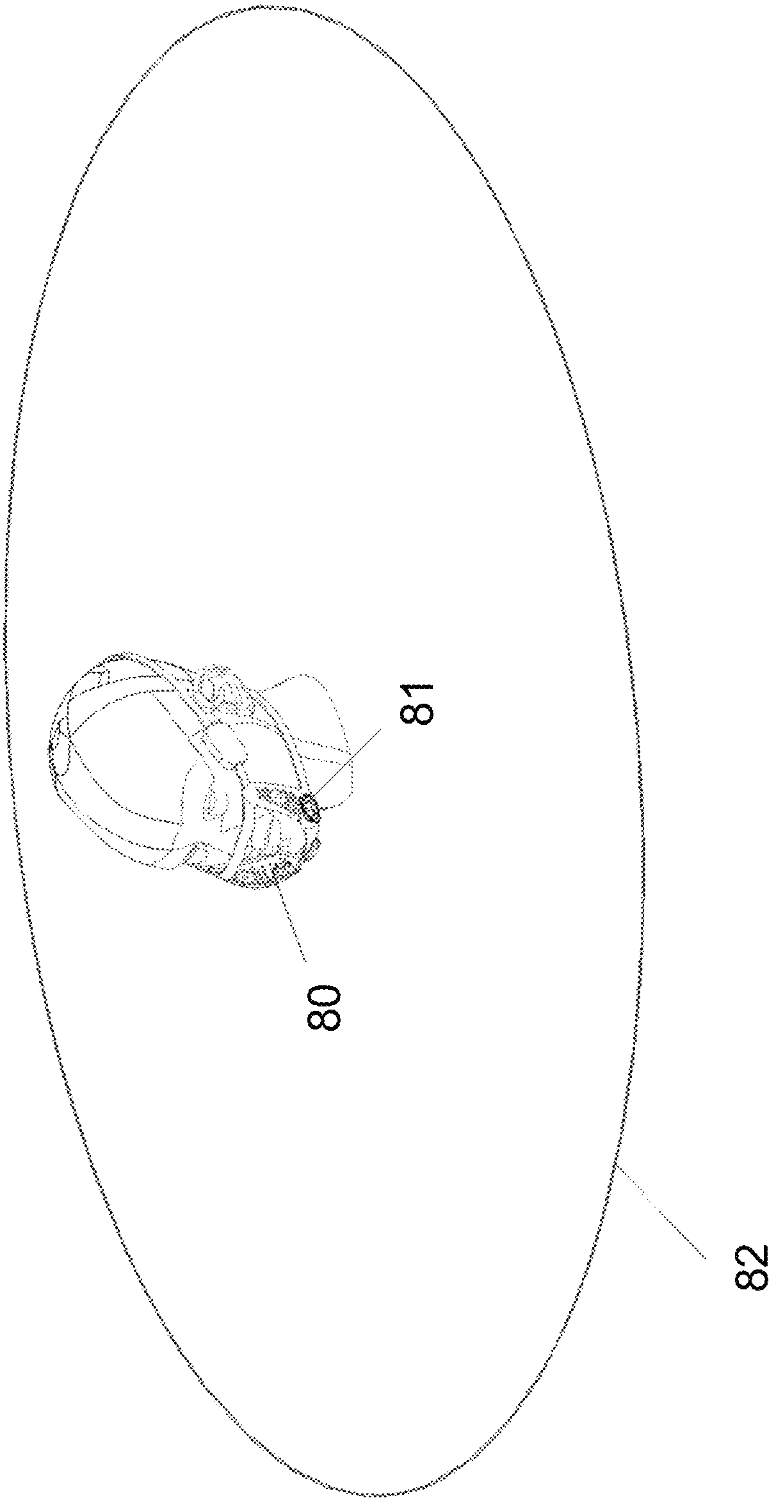
FIG. 15 is a front perspective view of the person wearing the mask of FIG. 14 showing a proximity distance.

FIG. 15 shows another embodiment of a face mask 80 described herein. Face mask 80 includes one or more proximity sensors 81 installed thereon. Proximity sensors 81 may be positioned around the face mask 80 and be configured to detect the presence of objects within a defined area 82 extending outwardly from the face mask 80 by a preselected distance (e.g. 2 meters) and extending 360 degrees around the face mask 80. Proximity sensors 81 may operate in combination with a signaling system to warn the wearer of the mask 80 if a person enters the defined area 82.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A face mask for being worn by a person, the face mask comprising:

a shell configured to cover a nose and a mouth of the person, at least a portion of the shell having sufficient transparency to provide for visual observation of the mouth of the person when the person is wearing the face mask, the shell having:

an inhale port configured to provide for air to pass from an environment into a cavity defined by the shell when the person wearing the face mask inhales;

an exhale port configured to provide for air to pass from the cavity to the environment when the person wearing the face mask exhales; and a retaining element coupled to the shell for retaining the face mask on the person, a sealing member coupled to a perimeter of the shell, the sealing member being configured to provide for the face mask to fit snugly against the face of the user and inhibit passage of air between the cavity and the environment; and a retainer ring configured to snap fit over the shell and couple to the sealing member to hold the shell and the sealing member together.

2. The face mask of claim 1 further comprising a first filter positioned in the inhale port such that air passing through the inhale port passes through the first filter, the first filter being configured to deactivate a pathogen in the air as the air passes through the first filter.

3. The face mask of claim 2, wherein the first filter is configured to be removable from the inhale port.

4. The face mask of claim 2 further comprising a second filter positioned in the exhale port such that air passing through the exhale port passes through the second filter, the second filter being configured to deactivate a pathogen in the air as the air passes through the second filter.

5. The face mask of claim 4, wherein the second filter is configured to be removable from the exhale port.

6. The face mask of claim 1, wherein the inhale port comprises a first inhale port and a second inhale port, the first inhale port and the second inhale port being positioned on opposed sides of the portion of the shell having sufficient transparency to provide for visual observation of the mouth of the person when the person is wearing the face mask, and the exhale port being positioned below the portion of the shell having sufficient transparency to provide for visual observation of the mouth of the person when the person is wearing the face mask.

7. The face mask of claim 4, wherein the pathogen is a virus.

8. The face mask of claim 1, wherein the inhale port or the exhale port further comprises one or more ultraviolet-C light emitting diodes (UVC LEDs) to sanitize air passing therethrough.

9. The face mask of claim 6, further comprising a sensor configured to measure personal body statistics of the person.

10. The face mask of claim 9, wherein the personal body statistics include at least one of: heart rate, breathing rate and body temperature.

11. The face mask of claim 1, wherein the face mask is configured to be coupled to a face shield that provides full face protection against fluid splash.

12. The face mask of claim 6 further comprising ear plugs coupled to the shell.

13. The face mask of claim 1, wherein the inhale port further comprises a fan to disperse air outwardly from within the cavity.

14. The face mask of claim 6 further comprising an audio system integrated into the face mask, the audio system comprising a microphone, an amplifier to amplify a voice of the person wearing the face mask and a speaker to transmit the voice of the person wearing the face mask outwardly from the face mask.

15. The mask of claim 6 further comprising one or more proximity sensors configured to detect a presence of one or more objects within a defined area extending outwardly from the face mask by a preselected distance and extending 360 degrees around the face mask.

* * * * *